United States Patent [19]

Ishikawa et al.

[11] Patent Number: 5,455,844

[45] Date of Patent: Oct. 3, 1995

[54] SELECTION DIVERSITY SYSTEM USING DECISION FEEDBACK EQUALIZER IN DIGITAL MOBILE TELECOMMUNICATION SYSTEMS

[75] Inventors: Hiroyasu Ishikawa, Warabi; Hideo Kobayashi, Fujimi, both of Japan

[73] Assignee: Kokusai Denshin Denwa Kabushiki Kaisha, Tokyo, Japan

[21] Appl. No.: 181,197

[22] Filed: Jan. 13, 1994

[30] Foreign Application Priority Data

Jan. 20, 1993 [JP] Japan .................................. 5-023441

[51] Int. Cl.$^6$ .............................. H03H 7/30; H03D 1/00; H03D 1/04
[52] U.S. Cl. ........................... 375/232; 375/340; 375/346
[58] Field of Search ................. 375/94, 99, 100, 375/101, 14, 232, 240, 346, 347, 348

[56] References Cited

U.S. PATENT DOCUMENTS 4,760,596  7/1988  Agrawal .................................. 379/410
5,345,452  9/1994  Matui .................................... 371/43

Primary Examiner—Edward L. Coles, Sr.
Assistant Examiner—Allan A. Esposo
Attorney, Agent, or Firm—Emmanuel J. Lobato

[57] ABSTRACT

A selection diversity system using a decision feedback equalizer which has excellent tracking ability performance and equalization ability performance for frequency selective fading and a diversity effect against Rayleight fading. In a selection diversity system using a decision feedback equalizer, a decision data symbol of the equalizer output of a branch in which an average estimation error over a plurality of symbols is minimum is selected and combined, and the selected decision data symbol is used to recalculate the estimation error of every decision feedback equalizer and the tap gain coefficient of the decision feedback equalizer is updated using the recalculated estimation error, thereby overcoming the step out by the integration of the estimation error and the random selection error which is caused by the selective combined diversity system.

2 Claims, 8 Drawing Sheets

SELECTION DIVERSITY SYSTEM USING DECISION FEEDBACK EQUALIZER IN DIGITAL MOBILE TELECOMMUNICATION SYSTEMS

BACKGROUND OF THE INVENTION

The present invention relates to a selection diversity using a decision feedback equalizer which is used in digital mobile telecommunication systems such as a digital auto-mobile telephone system, a digital portable telephone system and a digital cordless telephone system, and digital radio telecommunication systems such as a digital satellite communication system and a digital mobile satellite communication system.

To meet with the recent demand for digitization of auto-mobile telephone, portable telephone and similar land mobile telecommunication systems, a variety of digital radio techniques are now being studied, developed and put to practical use. While at present a medium speed system of a 42 kbps information transmission rate is being adopted as a next-generation automobile telephone system, it is being desired to develop a wide band digital mobile telecommunication system whose transmission rate is as high as hundreds to several megabytes per second so as to meet with a future demand for higher transmission efficiency.

Incidentally, such a broad band digital mobile telecommunication system seriously suffers deterioration of bit error rate performance which is caused by the degradation of the receiving signal level owing to Rayleigh fading inherent in the land mobile telecommunication system and deterioration of the bit error rate which is caused by intersymbol interference owing to frequency selective fading. As a solution to the former problem presented by the degradation of the receiving signal level owing to the Rayleigh fading, there is now being studied and developed a space diversity receiving system which improves the receiving performance by receiving signals with a plurality of spaced-apart antennas and selecting or combining the received signals. As a solution to the latter problem by the intersymbol interference owing to the frequency selective fading, there is now being studied and developed a decision feedback equalizer which feeds the result of decision at its output back to a feedback tap of a transversal filter which estimates and implements an inverse response of a time response in the frequency selective fading communication channel. Up to now, a selection diversity system using a decision feedback equalizer shown in FIGS. 3 and 4 have been proposed as demodulating systems which combines the above-mentioned two transmission techniques.

FIG. 3 shows a two-branch, selection diversity system using a decision feedback equalizer which selects a branch by comparing receiving levels with each other. Independent receiving circuits I(12), II(12) and equalizers I(14), II(24) are provided in association with two antennas 11 and 12 of branches I and II, respectively. An output $R_1$(104) from a received level detector I(103) which detects the level of a received signal in the branch I and an output $R_2$ (204) from a received level detector II(203) which detects the level of a received signal in the branch II are compared with each other by a received signal level comparator 54, and a decision value of the equalizer output of the branch of the higher received signal level is selected by a branch selector 33, from which it is output as a decision data sequence 34. In the frequency selective fading communication channel, however, the branch of the higher received signal level is not always high in equalization accuracy but the branch of the lower received signal level may sometimes be excellent in equalization accuracy. This leads to a problem that the equalizer using the diversity receiving system degrades the receiving performance more than does an ordinary equalizer which does not utilize the diversity receiving system. One possible solution to this problem is proposed in Japanese Pat. Pub. No. 111542/92 entitled "Diversity Method." FIG. 4 shows the construction of a receiving apparatus of this "diversity method" and FIG. 5 the construction of a decision feedback type equalizer for use in the receiver.

In the diversity receiver depicted in FIG. 4, the independent receiving circuits I (12), II (13) and equalizers I (14), II (24) are provided in association with the two antenna branches I (11), II (21), respectively. An output $\overline{E}_1$ (17) from an estimation error average value detector I (16) which detects the average value of estimation errors $e_1(t)$ (15) of the equalizer I (14) over a plurality of symbols in the branch I and an output $\overline{E}_2$ (27) from an estimation error average value detector II (26) which detects the average value of estimation errors $e_2(t)$ (25) of the equalizer II over a plurality of symbols in the branch II are compared with each other by an estimation error comparator 31, and the equalizer output of the branch decided to be smaller in estimation error average value than in the other branch is selected by the branch selector 33, from which it is output as the decision data sequence 34.

In FIG. 5 the decision feedback equalizer comprises: a feed-forward filter 37; a feedback filter 43; an adder 40 for adding their outputs 38 and 44; a decision circuit 41 for deciding the adder output 40; an estimation error detector 45 for detecting a difference between the decision circuit output 42 and the adder output 40; and a tap gain coefficient update circuit 51 for calculating the tap gain coefficients by the use of an estimation error 57 and for updating the tap gain coefficients accordingly. The estimation error 57 is used to calculate tap gain coefficients and updated tap gain coefficients 52 and 53 are used to update the taps of the feed-forward filter 43 and the feedback filter 37, whereby it is possible to accurately equalize intersymbol interference in accordance with a change of the propagation path. By selecting a branch through utilization of the average value of estimation errors and combining decision values of the equalizer output of the selected branch as a data sequence as in the above-mentioned "diversity system," it is possible to solve the problem of the selection diversity system using a decision feedback equalizer which selects the branch according to the receiving signal level as referred to above; hence, it is possible to improve the receiving performance by virtue of the diversity effect.

In FIG. 6 there are shown an equalization accuracy performance of the equalizer of each branch in the conventional selection diversity system using a decision feedback equalizer and a phenomenon of a selection error in the branch. In the interests of brevity, the number of branches shown is two and it is assumed here that communications take place in the form of a burst signal on the supposition of the use of a TDMA (Time Division Multiple Access) system. Usually, a TDMA frame is composed of a unique word part (corresponding to a training sequence in the equalizer) made up of a known symbol sequence and an information signal part made up of an unknown symbol sequence.

In FIG. 6, the equalizers of the branches I and Ii normally operate in sections d11 and d21, but in sections d12 and d22 a step out is caused by a decrease in the receiving signal level owing to fading and the equalization algorithm becomes divergent. It will be seen from FIG. 6 that in the case of a method of merely comparing with each other the estimation errors of the two branches and selecting one of them accordingly, the estimation error of the branch I happens to be smaller than the estimation error of the branch II in a section c12 although the equalizer of the branch II is normal, with the result that a selection error is induced by the application of the diversity system. Furthermore, in a section c13 (d22) the both branches are out of synchronism and hence are in a random error state and the equalization algorithm will not be pulled in again in one frame.

In the selection diversity system using a decision feedback equalizer which selects one of branches on the basis of the result of comparison of their average estimation errors, the decision feedback equalizers of the respective branches are independent of one another and the result of decision of the equalized output from the decision feedback equalizer in a certain branch does not exert any influence on the decision feedback equalizers of other branches. That is, the performance of the decision feedback type equalizer in each branch is the performance itself of an ordinary decision feedback type equalizer which is obtainable in the case of reception of one branch, and improvement of the receiving performance by the application of the diversity receiving system is no more than the effect produced by merely avoiding a communication channel in a poor condition of propagation. Hence, it cannot be said that the conventional selection diversity system using a decision feedback equalizer takes full advantage of the merits brought about by the application of the diversity receiving system to the decision feedback equalizer.

SUMMARY OF THE INVENTION

An object of the present invention is to provide a selection diversity system using a decision feedback equalizer which avoid the step-out phenomenon by the integration of estimation errors and ensures the prevention of the random selection error.

To attain the objective, the selection diversity system using a decision feedback equalizer according to the present invention, wherein decision feedback equalizers for equalizing intersymbol interference resulting from frequency selective fading are each provided independently of each branch of an antenna diversity receiver formed by a plurality of antennas and equalizer outputs of an antenna branch, decided to provide a minimum average value of estimation errors, are selected and combined, is characterized by a construction wherein the decision data symbol of that one of the branches in which the average estimation error over a plurality of symbols is decided to be minimum are selected and combined, the selected decision data symbol is used to recalculate estimation errors of all the decision feedback type equalizers and the tap gain coefficients of all the decision feedback type equalizers are updated using the recalculated equalization errors.

BRIEF DESCRIPTION OF THE DRAWINGS

The present invention will be described in detail below with reference to accompanying drawings, in which.

DETAILED DESCRIPTION OF THE INVENTION

Figure 7:
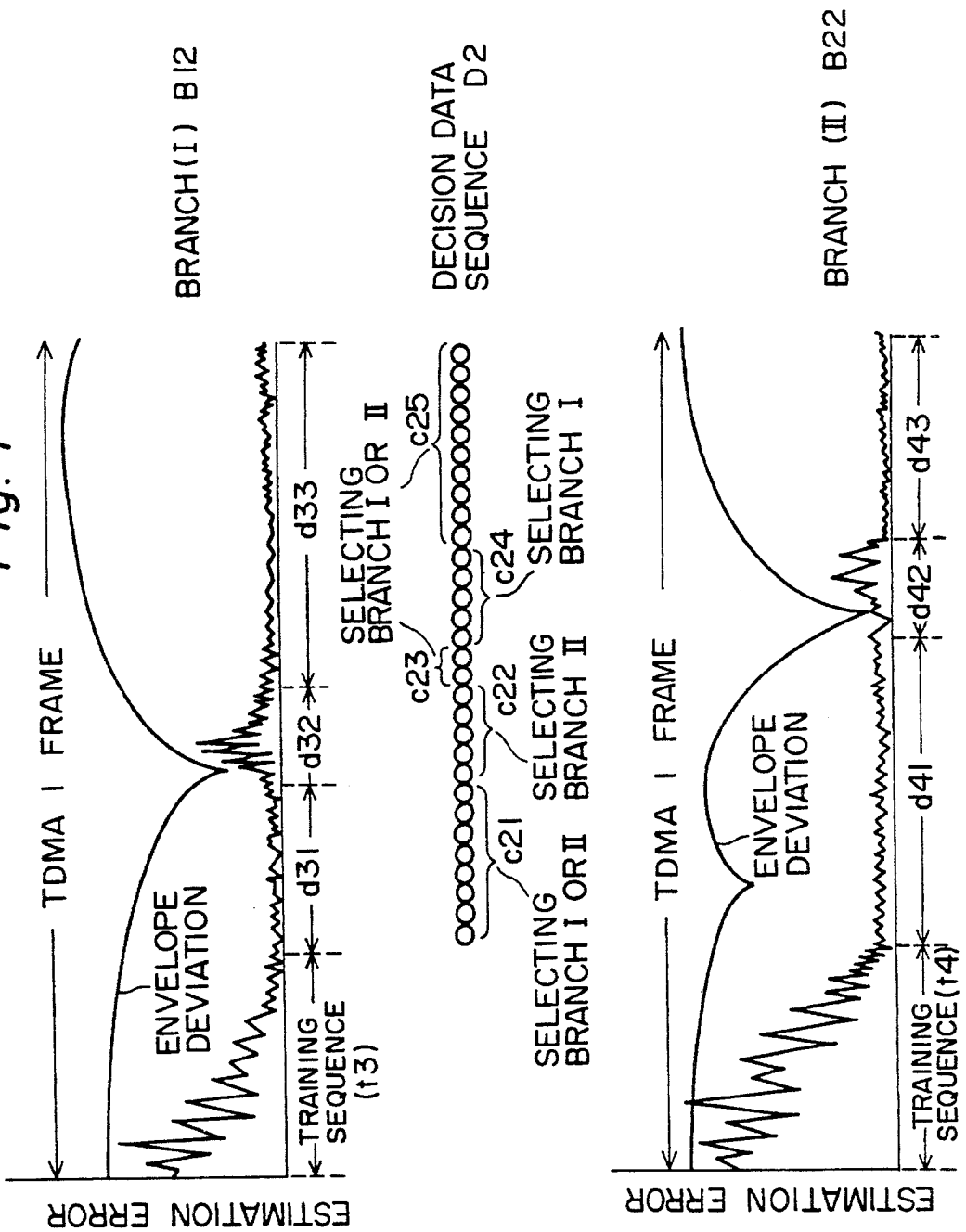
FIG. 7 is a timing chart showing the estimation error performance of the estimation error recalculating type, selection diversity system using a decision feedback equalizer according to the present invention.

FIG. 7 shows the equalization accuracy performance of the estimation error recalculating type, selection diversity system using a decision feedback equalizer according to the present invention. It is seen from FIG. 7 that the system of the present invention produces an effect of appreciably improving the conventional systems. For the sake of brevity, the number of branches shown is two.

In FIG. 7, the equalizers in the branches I and II normally operate in sections d31 and d41. In the branch I the equalization is out of synchronism in a section d32 owing to the degradation of the receiving signal level by fading. However, selected and combined decision data symbols are used to always recalculate the estimation error and a selected and combined decision data sequence is input into the feedback tap of the equalizer, by which equalization by the equalizer of the branch I becomes equivalent to the state of equalization using the training sequence, enabling the equalization algorithm to be pulled in again in the section d32 (c22). Similarly, in a section d42 (c23) the equalizer of the branch II once becomes out of synchronism, but the equalization algorithm can be pulled in again by the use of the decision data in the branch I, preventing the branch Ii from entering the state of divergence of the equalization algorithm owing to the step out, that is, the random error generating state. The above phenomenon is also applicable to the case of the step out which is caused by the integration of estimation errors.

According to the present invention, by recalculating the estimation error in every decision feedback type equalizer through use of the decision value obtained by comparison and selection and by updating the tap gain coefficient of the transversal filter through use of the recalculated estimation error and decision data, it is possible to solve the problem of the step out by the integration of the equalization error which is the defect of the conventional decision feedback type equalizer and the problem of random selection error which is induced by the application of the diversity system. Moreover, the error rate performance of the conventional selection diversity system using a decision feedback equalizer can substantially be improved by an excellent tracking ability and a high equalization accuracy performance of the decision feedback type equalizer by the system of the present invention and the diversity effect on the propagation path. With the substantial improvement of the error rate performance, it is possible to contribute to enhancement of the throughput of the land mobile telecommunication system accompanying the widening of its band, reduction of the transmitting power of portable telephone sets and alleviation of intersymbol interference, etc.

Figure 1:
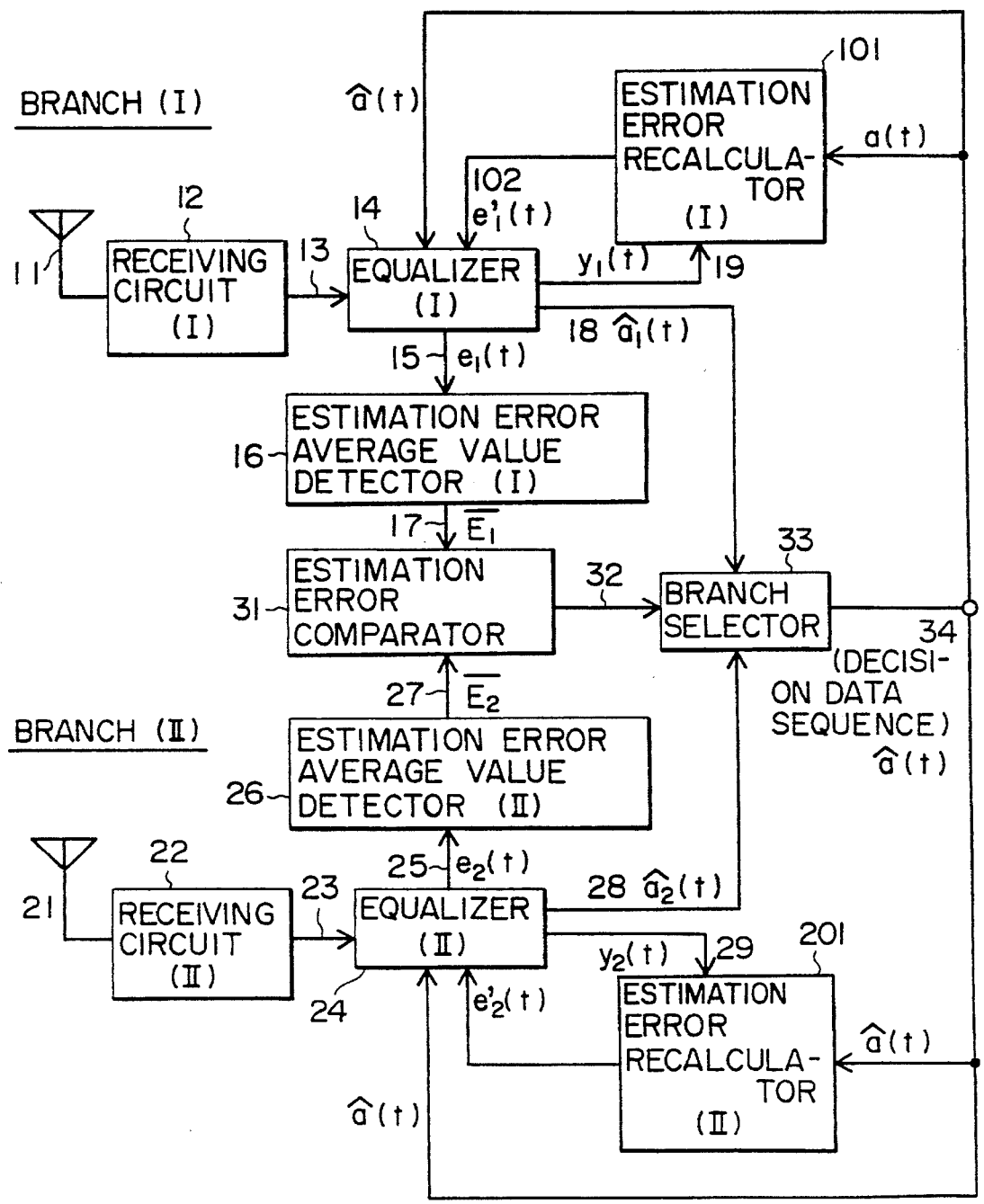
FIG. 1 is a block diagram illustrating an example of the construction of the estimation error recalculating type, selection diversity system using a decision feedback equalizer according to the present invention.

FIG. 1 illustrates, in block form, the construction of the equalization error recalculating type, selection diversity system using a decision feedback equalizer according to the present invention. For the sake of brevity, only two antenna branches are shown in FIG. 1. High-frequency signals received by the branches I (11) and II (21) are input as base band signals 13 and 23 via independent receiving circuits I (12) and II (22) into the equalizers I (14) and II (24), respectively. In this case, estimation errors 15 and 25 of the equalizers I and II are provided to the equalization error average value detectors I (16) and II (26), which calculate average values of estimation errors over the previous N symbols including equalization points. The average estimation error values $\bar{E}_1$ (17) and $\bar{E}_2$ (27) thus obtained are provided to an estimation error comparator 31 to thereby select the branch of the smaller average estimation error. The select information 32 is input into a branch selector 33, which selects either one of a decision data symbol $\hat{a}_1(t)$ (18) from the equalizer I and a decision data symbol $\hat{a}_2(t)$ (28) from the equalizer II and outputs it as a decision data data symbol a(t) (34).

Next, the decision data data symbol a(t) at this time t is input into an estimation error recalculator I (101) of the branch I and an estimation error recalculator II (201) of the branch II, wherein errors between the decision data symbol $\hat{a}(t)$ and equalized outputs $y_1(t)$ (19) and $y_2(t)$ (29) from the equalizers of the respective branches I and II are recalculated. Such recalculated estimation errors are fed as estimation error recalculated values $e_1'(t)$ (102) and $e_2'(t)$ (202) back to the equalizers I (14) and II (24), respectively. In the case where the decision data symbol a(t) 34 is equal to the equalizer output decision symbol $\hat{a}_1(t)$ (18) and $\hat{a}_2(t)$ (28), the estimation errors need not be recalculated.

Figure 2:
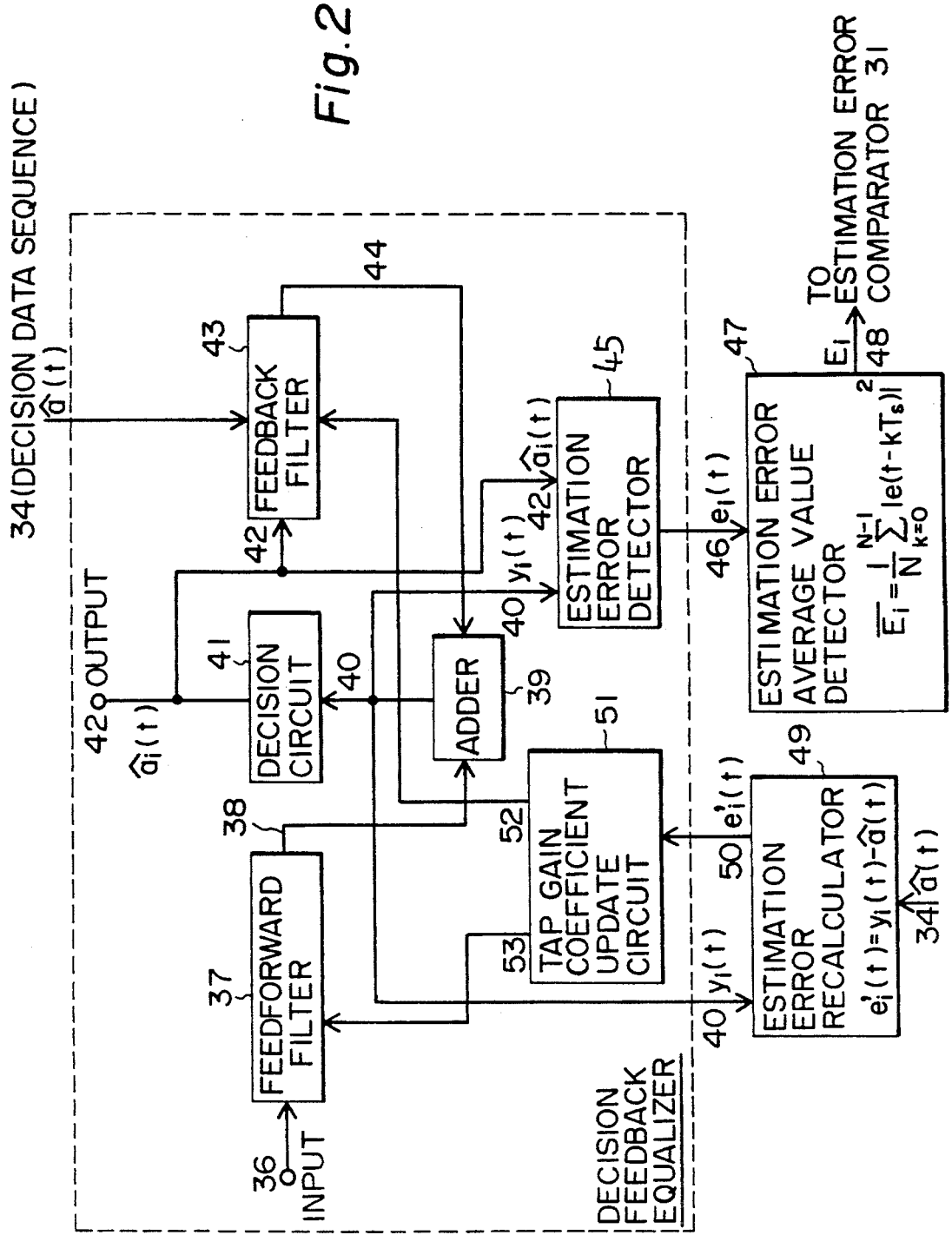
FIG. 2 is a block diagram showing an example of the construction of the decision feedback equalizer for use in the present invention.
Figure 3:
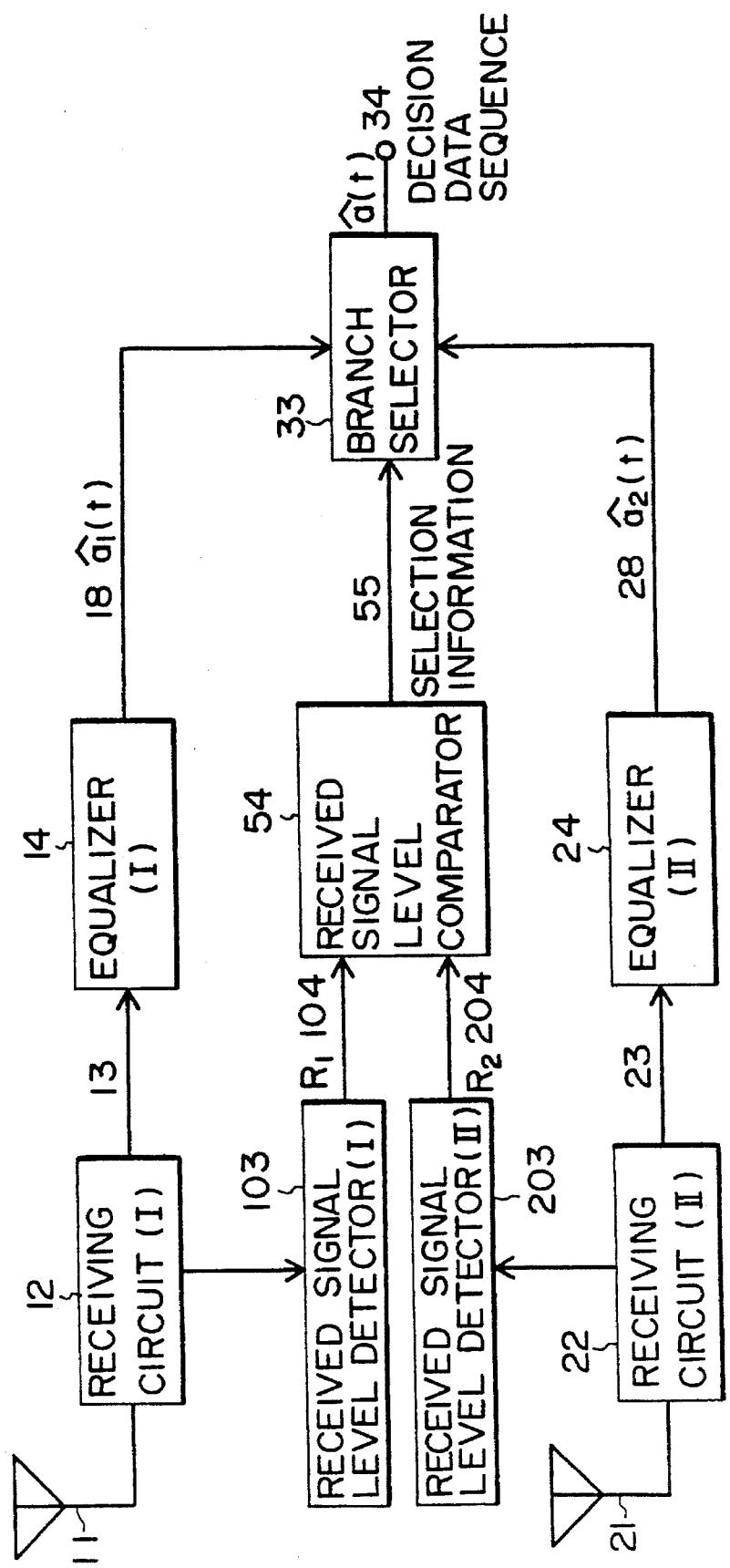
FIG. 3 is a block diagram showing an example of a conventional selection diversity system using a decision feedback equalizer which performs the selection of a branch according to the receiving signal level.
Figure 4:
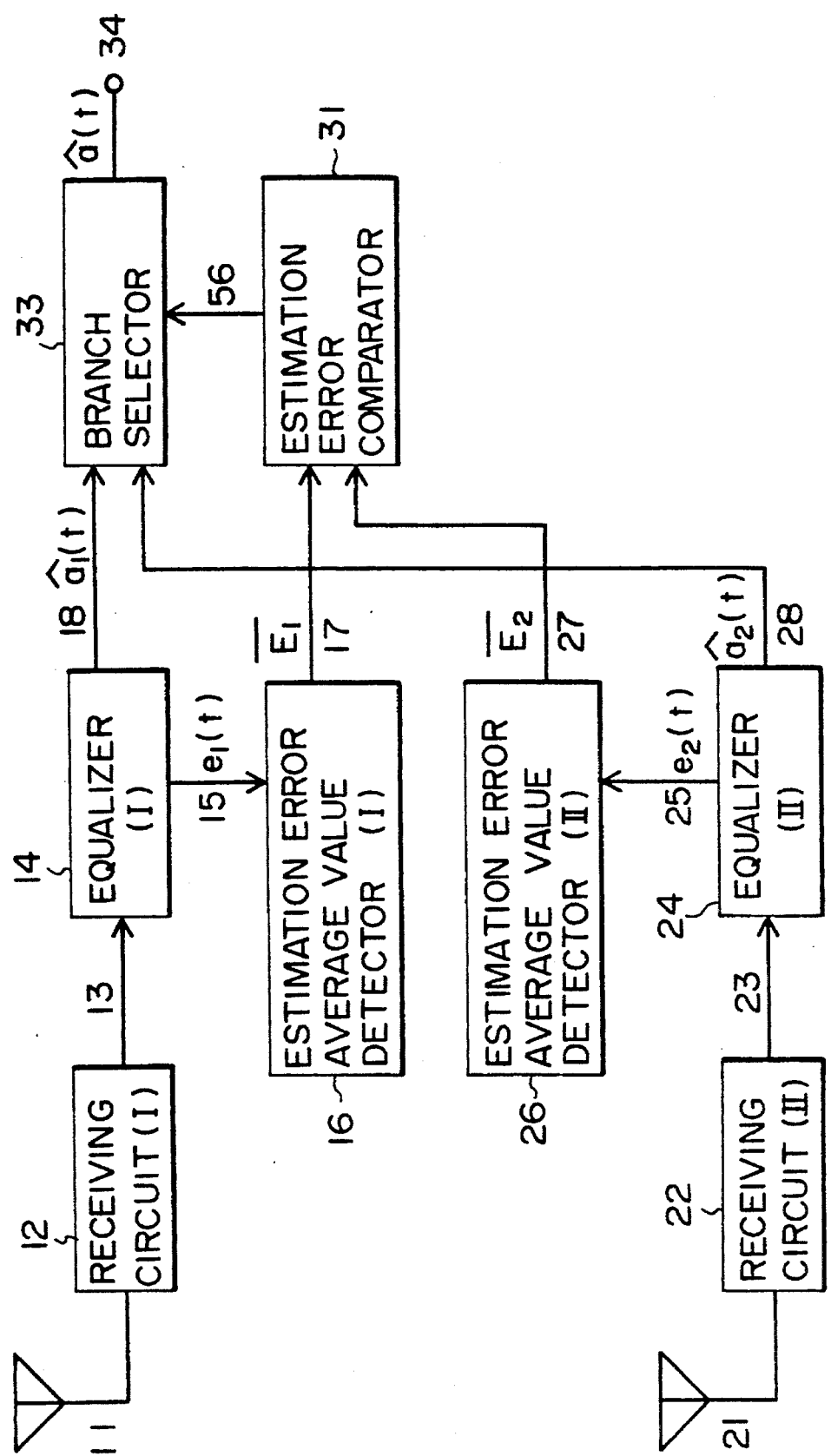
FIG. 4 is a block diagram showing an example of a conventional selection diversity system using a decision feedback equalizer which performs the selection of a branch according to the estimation error.
Figure 5:
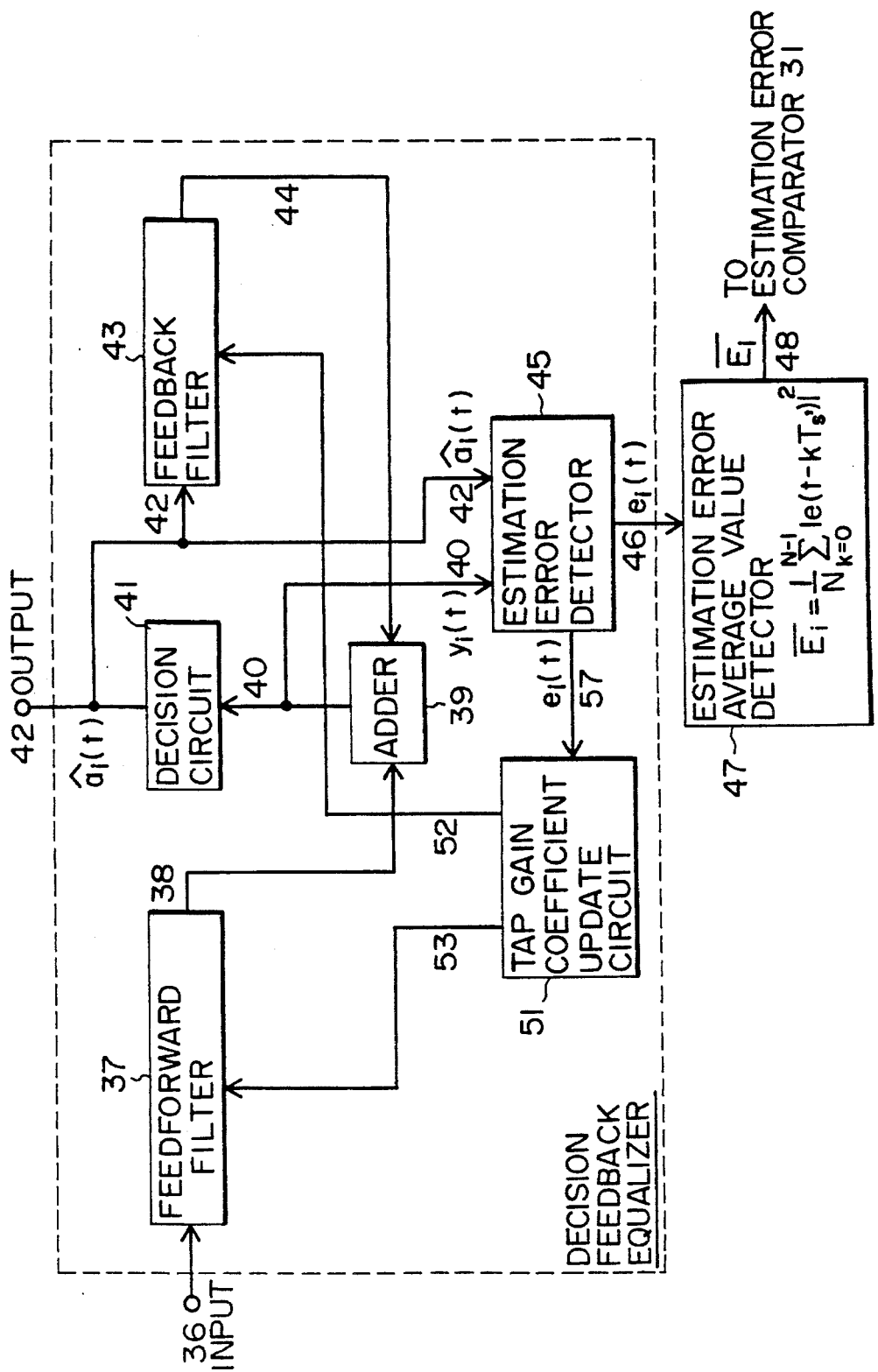
FIG. 5 is a block diagram showing an example of the construction of a decision feedback equalizer for use in the conventional selection diversity system using a decision feedback equalizer which performs the selection of a branch according to the estimation error.
Figure 6:
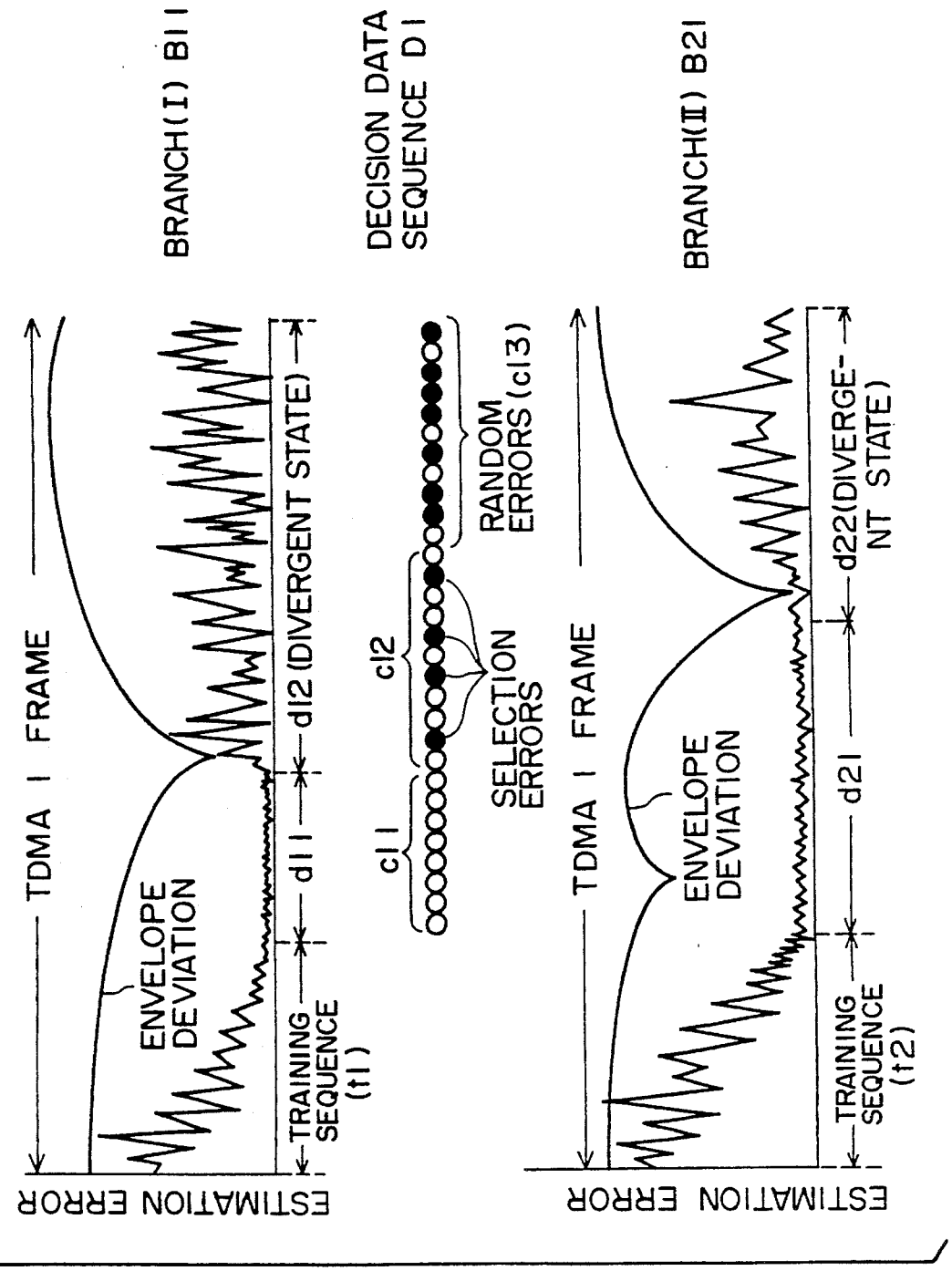
FIG. 6 is a timing chart showing the equalization accuracy performance of the conventional selection diversity system using a decision feedback equalizer.

FIG. 2 illustrates, in block form, an example of the construction of the decision feedback type equalizer for use in the system of the present invention. In FIG. 2 the decision feedback equalizer comprises: a feed-forward filter 32; a feedback filter 43; an adder 39 for adding their outputs 38 and 44; a decision circuit 41 for deciding the adder output 40; an estimation error detector 45 for detecting a difference between the decision circuit output 42 and the adder output 40; an estimation error average value detector 47 for detecting an average value $\bar{e}_i$ (48) of an estimation error $e_i(t)$ 46; an estimation error recalculator 49 for deriving an estimation error recalculated value $e_i(5)$ 50 from the adder output $y_i(t)$ 40 and the decision data $\hat{a}(t)$ 34; and a tap gain update circuit 51 for calculating the tap gain using the output 50 from the estimation error recalculator 49 and for updating the tap gain. By calculating the tap gains through use of the estimation error recalculated value 50 and updating the tap gain coefficients of the feed-forward filter 37 and the feedback filter 43 on the basis of thus updated tap gains 52 and 53, it is possible to solve such problems as BER (bit-error rate) performance degradation by the propagational error of a decision error in the feedback filter and BER performance degradation by the integration of the estimation error. Furthermore, even if when the equalization algorithm of the equalizer of one of the branches becomes divergent owing to the degradation of the receiving signal level, for instance, if the equalizer of the other branch normally operates, its decision data can be regarded as a training sequence, and hence, the equalization algorithm can be pulled in again after its divergence.

Figure 8:
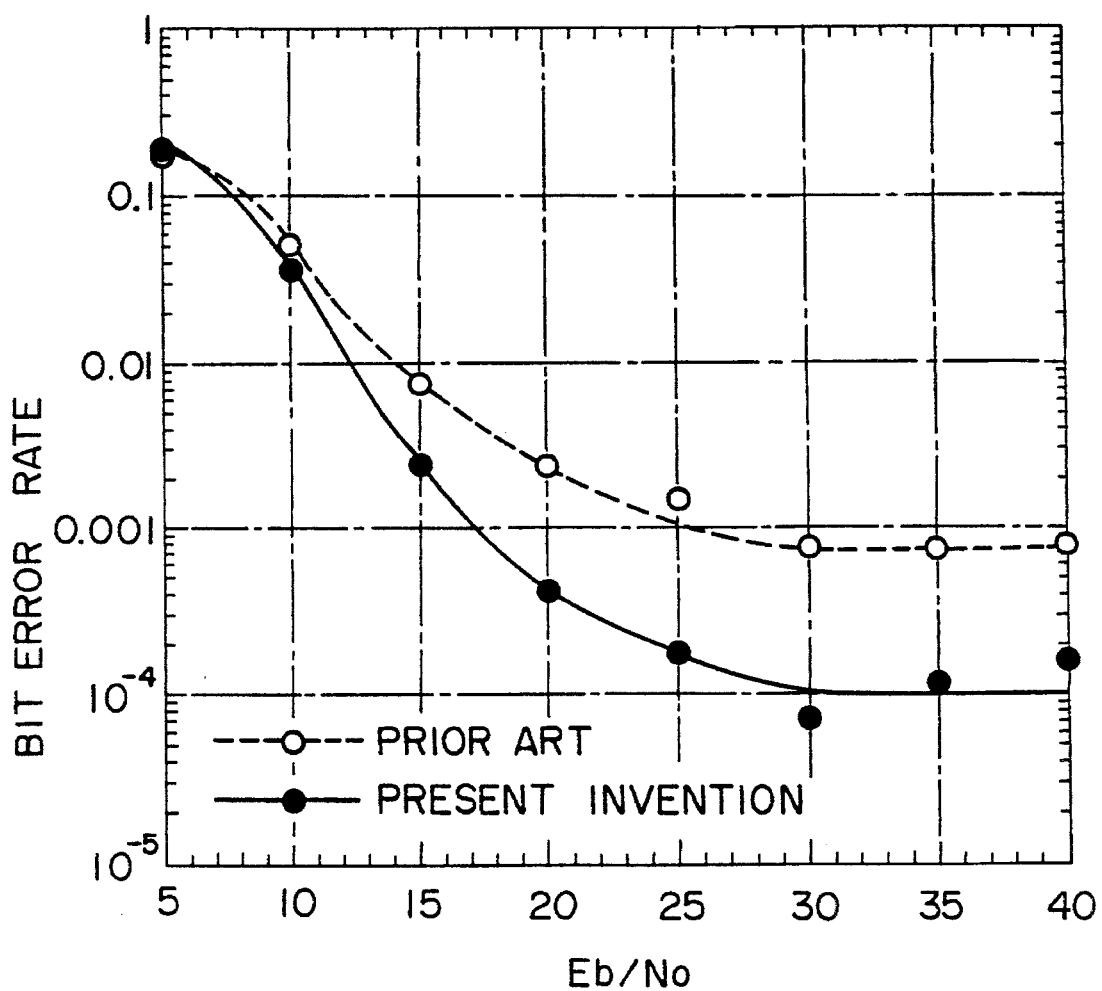
FIG. 8 is a graph showing the fit error rate performance of the estimation error recalculating type, selection diversity system using a decision feedback equalizer of the present invention in comparison with the bit error rate performance of a prior art example.

FIG. 8 shows the bit error rate performance of the system according to the present invention. In FIG. 8, Eb/No represents the ratio between the signal energy Eb and the noise power density No per bit. The simulations were made on the assumption that independent Rayleigh fading waves of the same mean power propagate over a propagation path at time intervals of one symbol period Ts under conditions such as: transmission data rate=128 kbit/sec; maximum Doppler width $f_d$=100 Hz; forgetting factor $\lambda$= 0.94; number of taps of the feed-forward filter=4 (at intervals of Ts/2, where Ts is the symbol period); number of taps of the feedback filter=2 (at intervals of Ts); one TDMA frame=128 symbols; and length of the training sequence=14 symbols. These conditions are very appropriate for the simulation of a next-generation digital mobile telecommunication system. The number N of symbols for obtaining the average value of estimation errors is 1, that is, the estimation error value at the equalization point is used intact.

It will be seen from FIG. 8 that according to the equalization error recalculating type, selection diversity system using a decision feedback equalizer of the present invention indicated by the solid line, the error rate performance in the floor region is improved as much as one order of magnitude higher than in the conventional selection diversity system using a decision feedback equalizer indicated by the broken line. From the results of simulations based on the propagation model of the land mobile telecommunication system, it is evident that the error rate performance can be substantially improved by the use of this invention system also in the actual land mobile radio channel.

According to the present invention, the estimation error in every decision feedback equalizer is recalculated using the decision data symbol selected by comparison and the estimation error recalculated value and the decision data symbol selected by comparison are used to update the tap gain coefficients of the transversal filter. By this, it is possible to solve the problem of the step out by the integration of the estimation error which is a defect of the conventional decision feedback equalizer and the problem of the random branch selection error which is caused by the application of the diversity system. Moreover, by the excellent tracking ability performance and equalization accuracy performance of the decision feedback equalizer and the diversity effect on the propagation path according to the system of the present invention, it is possible to greatly improve the receiving performance of the land mobile communication channel which suffers the degradation of the receiving signal level by Rayleigh fading and intersymbol interference by frequency selective fading.

What we claim is:

1. A selection diversity system using a decision feedback equalizer comprising:

a plurality of antennas;

a plurality of receivers respectively connected to the antennas to obtain respective baseband signals as outputs of the receivers;

a plurality of decision feedback type equalizers receptive of said respective baseband signals liar equalizing intersymbol interference in said respective baseband signals resulting from frequency selective fading to obtain respective decision outputs, respective equalized outputs and respective estimation errors;

a plurality of equalization error average value detectors receptive of said receptive estimation errors liar calculating respective average values of the respective estimation errors during a predetermined number of symbols including equalization points;

a comparator receptive of the respective average values of the respective estimation errors for providing selection information indicative of a smallest one of the respective average values of the respective estimation errors;

a selector receptive of the selection information for selecting, in accordance with the selection information, one of said decision outputs of the plurality of decision feedback type equalizers to obtain a selected decision output; and a plurality of estimation error recalculators receptive of the selected decision output from the selector and the respective equalized outputs from said decision feedback type equalizers to obtain respective recalculated estimation errors, which are fed back to the decision feedback type equalizers to update respective tap gain coefficients of said decision feedback type equalizers.

2. A selection diversity system using decision feedback equalizer according to claim 1, in which each of said decision feedback type equalizers comprises:

a feedforward filter receptive of the respective one of said baseband signals to obtain a feedforward output;

a feedback filter receptive of the selected decision output to obtain a feedback output;

an adder receptive of the feed forward output and the feedback output to obtain an added output which is employed as the respective one of said equalized outputs;

a decision circuit for obtaining the respective one of said decision outputs from the added output;

an estimation error detector receptive of the added output and said one of said decision outputs to obtain the rspective one of the estimation errors; and a tap gain update circuit receptive of the respective one of said recalculated estimation errors to obtain the respective tap gains thereby updating the respective one of the tap gain coefficients of said feedforward filter and said feedback filter.

* * * * *